United States Patent [19]
Ruppeneit et al.

[11] 3,772,911
[45] Nov. 20, 1973

[54] GROUND STRAIN GAUGE

[76] Inventors: Konstantin Vladimirovich Ruppeneit, Verkhnyaya 3, kv. 65; Evgeny Semenovich Prigozhin, Glagoleva 24, korpus 2, kv. 14, both of Moscow; Vsevolod Nikolaevich Denisov, Parkovaya 7, kv. 15, Ljubertsy Moskovskaya oblasti; Alexandr Vasilievich Golubev, Dokukina 9, kv. 14, Moscow, all of U.S.S.R.

[22] Filed: May 20, 1971

[21] Appl. No.: 145,304

[52] U.S. Cl. ............................................. 73/88 E
[51] Int. Cl. ........................................... G01n 3/10
[58] Field of Search .................... 73/88 E, 84, 94, 73/89, 37, 149

[56] References Cited
UNITED STATES PATENTS

| | | | |
|---|---|---|---|
| 2,957,341 | 10/1960 | Menard | 73/84 |
| 3,533,283 | 10/1970 | DaRocha et al. | 73/88 E |
| 3,503,254 | 3/1970 | Menard | 73/88 E |
| 3,499,320 | 3/1970 | Fox et al. | 73/94 |
| 3,481,188 | 2/1969 | Mori | 73/84 |
| 3,442,123 | 5/1969 | Broise | 73/151 |

FOREIGN PATENTS OR APPLICATIONS

| | | | |
|---|---|---|---|
| 501,186 | 11/1954 | Italy | 73/84 |

Primary Examiner—Charles A. Ruehl
Attorney—Waters, Roditi, Schwartz & Nissen

[57] ABSTRACT

A ground strain gauge is provided in which there is a working liquid storage tank which, in conjunction with shutoff valves at the inlet and outlet sides of two measuring cylinders, makes it possible to increase the working liquid volume in a flexible chamber inserted in a hole in the ground to be tested.

4 Claims, 1 Drawing Figure

PATENTED NOV 20 1973  3,772,911
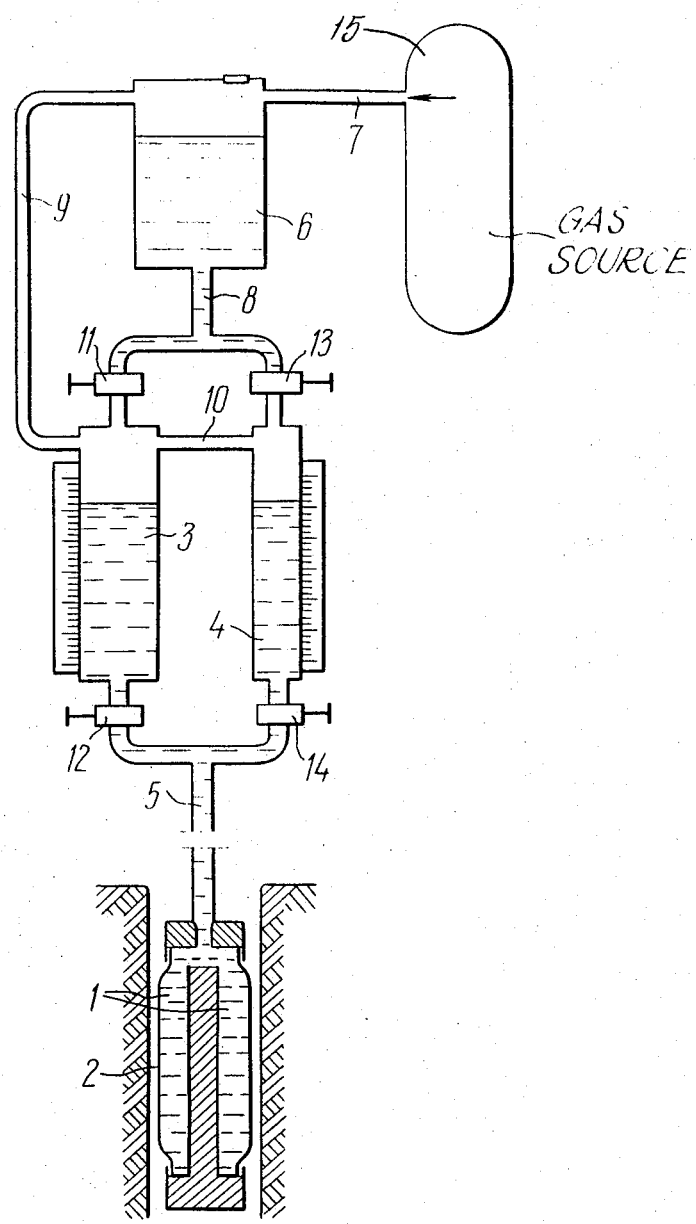

GROUND STRAIN GAUGE

This invention relates to measuring means and, more particularly, to ground strain gauges.

Ground strain gauges (soil strainmeters) are known in the art, which comprise a chamber with flexible side walls, wherein an appropriate liquid, such as water, oil, and the like, is forced into said chamber from a measuring cylinder by pressurized air, and said chamber communicates with a pressurized air source via said measuring cylinder.

These prior art gauges operate on the principle of measuring the volume of a liquid pumped into the instrument chamber disposed in a bore hole in the ground to be tested.

However, the known soil strain gauges suffer from the draw-back of being inadequately versatile, inasmuch as a given gauge does not lend itself to employment for testing various types of grounds that exhibit widely varying deformation characteristics.

It is an object of the present invention to avoid this disadvantage of the known gauges.

The present invention aims at providing the possibility of increasing the working volume of the liquid in the course of a single test by using the measuring cylinder repeatedly.

With this aim in view, the invention resides in the provision of a gorund strain gauge comprising a chamber with flexible side walls into which a liquid is fed by a pressurized gas from a measuring cylinder wherein, according to the invention, above the measuring cylinder provision is made for a built-in, closed liquid storage tank communicating with a pressurized gas source, the top and the bottom of said tank being connected by pipelines to the top part of the measuring cylinder, and the inlet and the outlet side of said measuring cylinder being furnished with shutoff valves.

To render the process of pumping the liquid to the flexible chamber uninterrupted, the present gauge should preferably incorporate at least one additional measuring cylinder placed in parallel with the first measuring cylinder and also having shutoff valves at its inlet and outlet sides.

In case the gauge, according to the invention, is employed for measuring the deformation of dense grounds, it is expedient to enhance the sensitivity of the instrument, without resorting to major readjustments thereof, by using measuring cylinders of dissimilar diameters.

In the following, the present invention is illustrated by a detailed description of a specific embodiment thereof with reference to the accompanying Drawing, in which the sole figure is a sectional view of the ground strain gauge, according to the invention.

The present gauge comprises a chamber 1 with flexible side walls 2. There are two measuring cylinders 3 and 4 of dissimilar diameters, said measuring cylinders being placed in parallel with each other and being connected to the chamber 1 by a pipeline 5. A working liquid (water) storage tank 6 is built into the gauge above the level of the measuring cylinders 3 and 4, said tank 6 communicating with a pressurized gas source 15 by a pipeline 7. The bottom of the tank 6 is connected to the measuring cylinders 3 and 4, while the top of the tank 6 communicates via a pipeline 9 with the measuring cylinder 3. The cylinder 3 is, in turn, connected to the second measuring cylinder 4 by means of a pipeline 10. At the inlet and outlet sides of the measuring cylinders 3 and 4, provision is made for shutoff valves 11, 12 and 13, 14 respectively.

Prior to commencing tests, the working liquid (water) is charged into the gauge so as to fill completely the chamber 1 and most of the volume of the measuring cylinders 3 and 4 and of the storage tank 6.

When the ground strain gauge is used to test soft soils, with the shutoff valves 11, 13 and 14 closed, pressurized gas (nitrogen) is admitted via the pipeline 7 in order to displace the working liquid from the measuring cylinder 3 into the chamber 1. Water inflow to the chamber 1 causes the flexible walls to expand and overcome the resistance offered by the ground being tested. Ground deformation is determined from the variation of the water volume in the measuring cylinder 3 at a given gas pressure.

When the present gauge is employed for testing more dense soils, it is preferable to resort to the measuring cylinder 4, which has a smaller diameter, and is, therefore, more suitable for recording accurately water volume variations.

In the present gauge, provision may be made for three, four or more measuring cylinders, depending upon the requisite accuracy range of ground strain measurements.

In case the ground under test is extremely soft and the water volume in the cylinder 3 is inadequate at a given gas pressure, the valve 12 should be close and the valve 11 opened in order to replenish the water in the cylinder 3 from the storage tank 6.

To avoid test discontinuation while the water is being added to the cylinder 3, the valve 14 should be opened to allow water from the cylinder 4 to be displaced into the chamber 1.

If necessary, the operation of alternative replenishment of the cylinders 3 and 4 with water may be carried out repeatedly.

After the readings have been taken, the valves 11, 12, 13 and 14 should be closed and the system depressurized, the excess pressure in the chamber 1 forcing the water therefrom into the measuring cylinders 3 and 4 and the storage tank 6.

We claim:

1. A ground strain gauge which comprises a chamber with at least one flexible side wall; a measuring cylinder having an inlet at one end thereof and an outlet at its other end; means for connecting said cylinder outlet to said chamber; a closed storage tank disposed above the level of said measuring cylinder; means for communicating the top of said tank with the top of said measuring cylinder; means for connecting the bottom of said tank to said cylinder inlet; shutoff valves mounted at the inlet and the outlet of said measuring cylinder; and a pressurized gas source connected to the top of said storage tank.

2. A ground strain gauge according to claim 1, wherein there is at least one additional measuring cylinder having an inlet and outlet with shutoff valves and disposed parallel to the first said measuring cylinder, each additional cylinder being connected by its valved inlet to the bottom of said tank and by its valved outlet to said chamber.

3. A ground strain gauge according to claim 2 wherein said measuring cylinders have dissimilar diameters.

4. A ground strain gauge according to claim 2, wherein means are provided for communicating the tops of the cylinders.

* * * * *